United States Patent Office 2,789,974
Patented Apr. 23, 1957

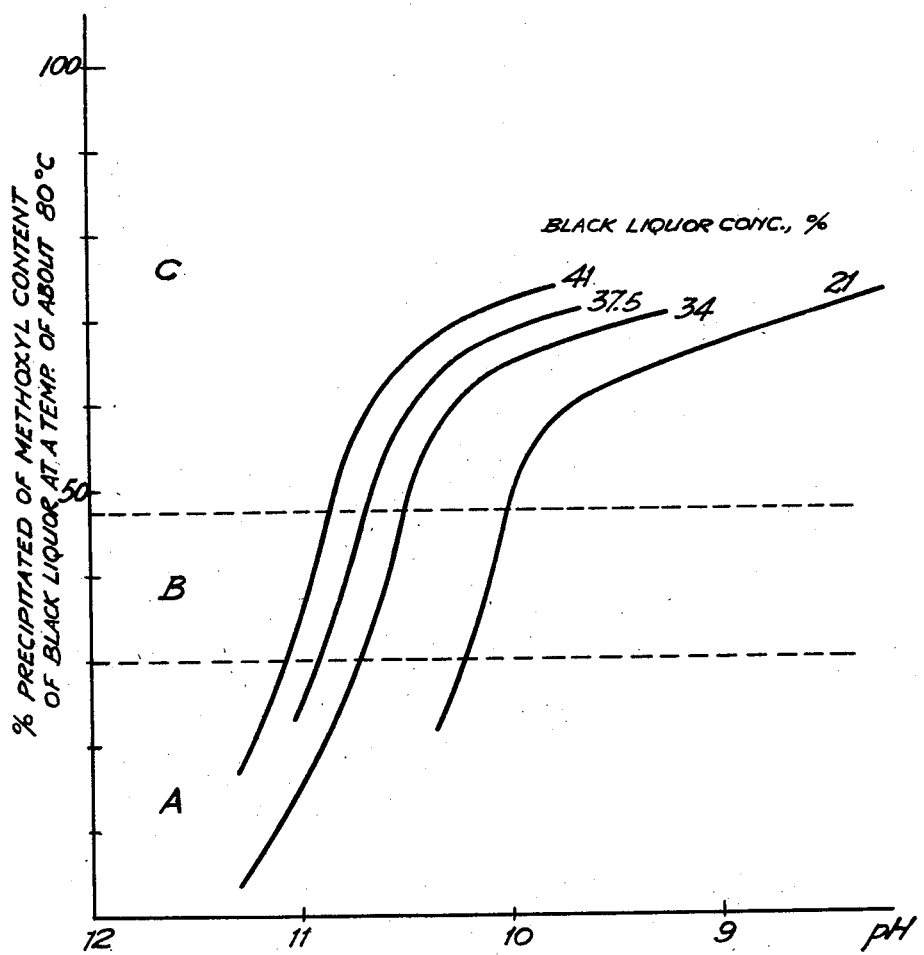

2,789,974

PROCESS FOR PRODUCING TANNING AGENTS FROM BLACK LIQUOR LIGNIN

Erik Karl Mauritz Hägglund, Stockholm, Lars Eric Georg Hällström, Sollentuna, and Hermann Martin Richtzenhain, Stockholm, Sweden, assignors to Svenska Cellulosaföreningens Centrallaboratorium (Cellulosaindustriens Centrallaboratorium), Stockholm, Sweden, a corporation of Sweden Application June 13, 1955, Serial No. 515,188

Claims priority, application Sweden September 28, 1954

14 Claims. (Cl. 260—124)

This invention relates to a process for producing tanning agents employing black liquor lignin obtained in the alkaline methods of digesting wood and other cellulose-containing materials as the raw material.

The invention is based on the surprising discovery that a certain fraction of the lignin contained in the black liquor is far more suitable as a raw material for the production of valuable tanning agents than the remaining lignin of the liquor.

In conformity therewith, according to the invention, the lignin of the black liquor is subjected to fractional precipitation at decreasing pH-values, whereby lignin with a higher molecular weight is first precipitated from the liquor, this precipitate being separated out, whereupon on continued precipitation at lower pH-values lignin with a lower molecular weight is precipitated which has proved to be particularly suitable as a raw material for the production of tanning agents and this fraction is treated further by sulphonation.

The precipitation of the lignin may be carried out in two or more stages. In any case, the fraction or fractions of lignin of higher molecular weight which are precipitated and separated out as being not useful for the purpose in question should correspond to at least an amount of about 30% and preferably about 50% of the methoxyl content of the liquor.

As precipitating agent any desired acid may be employed which is suitable for the purpose but advantageously the precipitation is carried out by blowing carbon dioxide or carbon dioxide-containing gases, such as flue gases, into the liquor, to the desired pH values in the different stages of precipitation.

The black liquor is preferably concentrated somewhat prior to the precipitation of the lignin. For example, the concentration of the liquor may correspond to a content of solids of 10-50%, suitably 20-40%, and preferably 25-35%. Conveniently, the liquor may be subjected to the treatment according to the invention in the form in which it is obtained after the separation of the liquid resin therefrom when it will generally have a content of solids of about 25%. Preferably the precipitation is carried out at increased temperature of the liquor, for example temperatures within the range 50-100° C.

The separation of the lignin precipitates may be effected in various ways, such as by sedimentation and decantation or by filtration or centrifuging.

The amount of lignin which at a given pH value can be precipitated in the form of its sodium salts by carbon dioxide depends on the concentration of the black liquor. Owing to the "salting out" effect of the sodium salts contained in the liquor, more lignin is precipitated from a black liquor of higher concentration than from a liquor of lower concentration. The relations between the concentration of the liquor, the pH-values and the amounts of the precipitate are illustrated diagrammatically in the accompanying drawing showing the amount of lignin, expressed in percent of the methoxyl content of the liquor, that can be precipitated from liquors of different concentration at different pH values at a temperature of about 80° C.

As will be seen from the drawing, at a pH of 11, an amount of 15% of lignin is precipitated from a liquor having a concentration of 34%, while in case of a liquor having a concentration of 41% the amount of lignin which is precipitated is 35%. Further, comparison between the curves representing liquors having a concentration of 34% and 21%, respectively, shows that in the first case an amount of 47.5% of the lignin is precipitated at pH=10.5 while in the latter case the precipitation of an equal amount of lignin requires a decrease of the pH to 10.

According to the invention, the lignin fractions precipitated in the field A of the drawing below the line I—I are separated out while the fractions of lignin precipitated in the fields B and C above that line are isolated and subjected to the action of a sulphonating agent, such as sulphur dioxyde or a soluble sulphite. The sulphonation is carried out in neutral or, preferably, alkaline solution and at increased temperature, suitably within the range 90-150° C.

The resulting sulphonated lignin product is then isolated from the solution by precipitation with an acid, if desired after concentration of the solution prior to the precipitation. For this purpose sulphuric acid is suitably employed and is added in such a quantity that the solution obtains a pH value of about 3.5. The precipitation is preferably carried out with the addition of sodium sulphate and at a temperature at which the precipitate is sintered, for example within the range 50-100° C. This is important, since in this way a precipitate is obtained which can be easily separated by filtration and the rate of solubility of which is so low that the product may be washed down to a low ash content without this entailing any considerable losses of the substance.

For comparison it may be mentioned that a tanning agent produced as described from a lignin fraction obtained in the field C in the drawing, above the line II—II, has a very high tanning power and yields a leather having a tanning degree of about 55% and with an increase in the shrinkage temperature of 9° C. When using the lignin fraction obtained in the field B of the drawing a tanning agent is obtained yielding a leather having a tanning degree of about 43% and an increase in shrinkage temperature of 6° C. A lignin product containing the combined fractions of the fields B and C gives a tanning agent yielding a leather having a tanning degree of about 48% and an increase in the shrinkage temperature of 7° C. Finally, a sulphonated product of the lignin precipitated in field A is under the same tanning conditions unable to penetrate the hide completely.

Example 1

Into 100 litres of black liquor (content of solids 21% containing 5% methoxyl; specific gravity 1.15) carbon dioxide was introduced while stirring, until the solution had attained a pH value of about 10, whereby a fraction of high molecular lignin was precipitated.

This precipitate (6 kgs. containing 9.5% methoxyl) was separated from the solution by decantation and the solution was then saturated in a cold state with carbon dioxide to a pH of 7.9. The solution was then heated with steam to a temperature of about 90° C. which resulted in an increase of the pH to 8.3 and at the same time the lignin precipitate was deposited as a liquid bottom layer. The wet lignin precipitate weighed 6 kgs. and contained 47% of water and 8.4% of ash; methoxyl content 9.5%.

This lignin precipitate was dissolved in 7 litres of water and a solution of 350 g. sodium hydroxide and 320 g.

sulphur dioxide in 1 litre of water was added thereto whereupon the solution was heated for 3 hours at 150° C.

The solution thus obtained was admixed at 30° C. under stirring with 900 g. of sulphuric acid and 1.35 kgs. of anhydrous sodium sulphate. The mixture was heated to 85° C. whereby the precipitated sulphonated lignin product was sintered to a granular precipitate. This precipitate was filtered off and washed first with 6 kgs. of a 10% sodium sulphate solution, then with 4 kgs. of a 2.5% of a sodium sulphate solution and finally with 4 litres of water.

The yield of tanning agent thus obtained was 2.73 kgs., said product having a moisture content of 8.2% and containing 2.84% sulphur, 5.1% ash and 0.34% sulphate.

The product so obtained was readily soluble in water and was not precipitated on addition of acetic acid. On tanning, it yielded an excellent leather having a tanning degree of 55% and an increase in the shrinkage temperature of 9° C. The favourable properties of this lignin tanning agent were especially pronounced when used in mixed tanning together with minosa extract whereby a leather was produced which was superior to that obtained with either of these tanning agents alone.

*Example 2*

Into 100 kgs. black liquor (content of solids 34%; specific gravity 1.20) carbon dioxide was introduced at 90° C. until the solution has attained a pH of 10.5, whereby a fraction of high molecular lignin was precipitated.

This precipitate (7.1 kgs. in dry state containing 10.1% methoxyl) was separated from the solution by decantation. The introduction of carbon dioxide into the solution was then continued at 80° C. until the solution had attained a pH of 9.3. The lignin precipitate thus formed was deposited as a liquid bottom layer. The wet lignin precipitate weighed 8.0 kgs. and contained 41% of water and 15% of ash, the methoxyl content being 9.5%. This lignin precipitate was dissolved in 10 litres of water and 420 g. sulphur dioxide was added thereto. The solution was then admixed with 33% sodium hydroxide in an amount sufficient to produce a pH of 8.5 and was then heated for 3 hours at 150° C.

The isolation of the tanning agent was effected in the same manner as in Example 1. The product had the same tanning properties as in this example.

What we claim is:

1. In the manufacture of water-soluble products possessing tanning properties from black liquor lignin, the process which comprises fractionally precipitating lignin from black liquor by introducing an acid therein at decreasing pH-values until at least an amount of lignin corresponding to about 30% of the methoxyl content of the liquor is precipitated, said lignin fraction containing the most high-molecular lignin of the liquor, separating the precipitate thus formed, continuing introduction of acid into the remaining liquor at still lower pH-values, whereby more low-molecular lignin is precipitated, isolating the lignin fraction thus precipitated, sulphonating said isolated lignin fraction containing the low-molecular lignin by subjecting it to the action of a sulphonating agent, selected from the class consisting of sulphurous acid and water-soluble salts of sulphurous acid, and then recovering the resulting water-soluble sulphonated lignin product.

2. The process of claim 1 wherein the precipitation of the lignin is carried out by blowing carbon dioxide-containing gas into the liquor.

3. The process of claim 1 wherein the black liquor is subjected to a partial concentration before the precipitation of the lignin.

4. The process of claim 1 wherein the precipitation of the lignin is carried out at increased temperature.

5. The process of claim 1 wherein the sulphonation is carried out in a non-acid solution.

6. The process of claim 1 wherein the sulphonation is carried out at increased temperature.

7. The process of claim 1 wherein the sulphonated product is precipitated from the sulphonating solution by addition of sulphuric acid.

8. In the manufacture of water-soluble products possessing tanning properties from black liquor lignin, the process which comprises fractionally precipitating lignin from black liquor by introducing carbon dioxide-containing gas into the liquor at increased temperature and at decreasing pH-values until at least an amount of lignin corresponding to about 30% of the methoxyl content of the liquor is precipitated, said lignin fraction containing the most high-molecular lignin of the liquor, separating the precipitate thus formed, continuing introduction of carbon dioxide gas into the remaining liquor at still lower pH-values, whereby more low-molecular lignin is precipitated, isolating the lignin fraction thus precipitated, sulphonating said isolated lignin fraction containing the low-molecular lignin by subjecting it to the action of a sulphonating agent, selected from the class consisting of sulphurous acid and water-soluble salts of sulphurous acid, in an alkaline solution at increased temperature, and then recovering the resulting water-soluble sulphonated lignin product.

9. The process of claim 8 wherein the black liquor prior to the precipitation is concentrated to a content of solids within the range of 20–40%.

10. The process of claim 8 wherein the precipitation of the lignin from the black liquor is carried out at a temperature within the range of about 50–100° C.

11. The process of claim 8 wherein the sulphonation is carried out at a temperature within the range of about 90–150° C.

12. The process of claim 8 wherein the fraction containing the more high-molecular lignin which is separated out comprises an amount of lignin corresponding to about 50% of the total methoxyl content of the liquor.

13. The process of claim 8 wherein the precipitation of the sulphonated product is carried out by addition of sulphuric acid in the presence of sodium sulphate at a temperature sufficiently high to produce a sintering of the precipitate.

14. In the manufacture of water-soluble products possessing tanning properties from black liquor lignin, the process which comprises fractionally precipitating lignin from black liquor having a content of solids within the range 20–40% by introducing carbon dioxide-containing gas into the liquor at a temperature within the range of about 50–100° C. and at decreasing pH-values until an amount of lignin corresponding to about 50% of the methoxyl content of the liquor is precipitated, said lignin fraction containing the most high-molecular lignin of the liquor, separating the precipitate thus formed, continuing introduction of carbon dioxide gas into the remaining liquor at still lower pH-values, whereby more low-molecular lignin is precipitated, isolating the lignin fraction thus precipitated, sulphonating said isolated lignin fraction containing the low-molecular lignin by subjecting it to the action of a sulphonating agent, selected from the class consisting of sulphurous acid and water-soluble salts of sulphurous acid, in an alkaline solution at a temperature within the range of about 90–150° C., precipitating the sulphonated lignin product by addition of sulphuric acid and sodium sulphate while heating to a temperature sufficient to produce a sintering of the precipitate, and then recovering the tanning agent so produced.

References Cited in the file of this patent
UNITED STATES PATENTS
2,680,113   Adler et al. _____ June 1, 1954